(12) United States Patent
Crockford

(10) Patent No.: US 11,953,920 B2
(45) Date of Patent: Apr. 9, 2024

(54) MEDIA PLAYBACK SYSTEM

(71) Applicant: DIGITAL & FUTURE TECHNOLOGIES LIMITED, Colchester (GB)

(72) Inventor: Christopher John Crockford, Colchester (GB)

(73) Assignee: DIGITAL & FUTURE TECHNOLOGIES LIMITED, Colchester (GB)

( * ) Notice: Subject to any disclaimer, the term of this patent is extended or adjusted under 35 U.S.C. 154(b) by 0 days.

(21) Appl. No.: 18/270,255

(22) PCT Filed: Jun. 6, 2022

(86) PCT No.: PCT/GB2022/051417
§ 371 (c)(1),
(2) Date: Jun. 29, 2023

(87) PCT Pub. No.: WO2022/254229
PCT Pub. Date: Dec. 8, 2022

(65) Prior Publication Data
US 2024/0045450 A1 Feb. 8, 2024

(30) Foreign Application Priority Data

Jun. 4, 2021 (GB) ..................................... 2108062

(51) Int. Cl.
*G05D 1/10* (2006.01)
*G05D 1/00* (2006.01)
(Continued)

(52) U.S. Cl.
CPC ............. *G05D 1/104* (2013.01); *B64U 10/00* (2023.01); *B64U 2101/21* (2023.01); *B64U 2201/102* (2023.01); *H04N 21/4307* (2013.01)

(58) Field of Classification Search
None
See application file for complete search history.

(56) References Cited

U.S. PATENT DOCUMENTS

2016/0088031 A1* 3/2016 Kumar .................. H04L 65/403
709/204
2017/0220037 A1 8/2017 Berestov et al.
(Continued)

OTHER PUBLICATIONS

Search Report issued in GB Application No. GB2307013.9 dated Jul. 11, 2023 (1 page).
(Continued)

*Primary Examiner* — Peter D Nolan
*Assistant Examiner* — Michael F Whalen
(74) *Attorney, Agent, or Firm* — Occhiuti & Rohlicek LLP

(57) ABSTRACT

A media playback system comprising a transmitter configured to transmit an indication of a media item; a plurality of drones; a controller configured to control the spatial configuration of the drones and, in response to receiving the indication of a media item control the drones to adopt a predefined 3D spatial configuration; a mobile device comprising a camera and a media playback unit, wherein the camera is capable of capturing an image of the plurality of drones; a processor configured to analyse the captured image to determine the media item that corresponds to the predefined 3D spatial configuration; and wherein the media playback unit is configured to play the determined media item.

19 Claims, 4 Drawing Sheets

(51) Int. Cl.
*B64U 10/00* (2023.01)
*B64U 101/21* (2023.01)
*H04N 21/43* (2011.01)

(56) References Cited

U.S. PATENT DOCUMENTS

| | | |
|---|---|---|
| 2018/0131864 A1 | 5/2018 | Bisti |
| 2019/0138031 A1* | 5/2019 | Arango .................. B64D 47/06 |
| 2020/0064870 A1 | 2/2020 | Pohl et al. |
| 2021/0142776 A1 | 5/2021 | Sadhwani et al. |
| 2021/0405661 A1 | 12/2021 | Liu |

OTHER PUBLICATIONS

International Search Report issued in International Application No. PCT/GB2022/051417, dated Oct. 17, 2022.

* cited by examiner

MEDIA PLAYBACK SYSTEM

CROSS REFERENCE TO RELATED APPLICATIONS

This application is the national phase under 35 USC 371 of International application no. PCT/GB2022/051417, filed Jun. 6, 2022, which claims the benefit of the filing date of United Kingdom Application No. 2108062.7 filed on Jun. 4, 2021, the contents of all of which are hereby incorporated by reference in their entireties.

FIELD

The present invention relates to a system and a method for media playback using a configuration of drones to indicate a media item to be played to a user.

BACKGROUND

It is known in the art to use swarms of drones for display purposes, often in conjunction with one or more of fireworks, music, and lights. The drones may take various configurations in the sky in order to display 2D or 3D text or images.

Such shows may be controlled by a central controller that uses a common timecode to synchronise each element of the show. In general, it is preferable for the overall display to present the same media to all views, at least as far as different viewing angles allow. Such displays lack mechanisms for interactions with the user and lack any means by which the media can be targeted towards specific parts of the audience.

Furthermore, traditional, non-interactive media including film, television, radio, and the aforementioned drone shows require no active participation on the part of a viewer. This results in a passive experience for a viewing, resulting in reduced engagement.

There is a need for improved means of media playback.

SUMMARY OF THE INVENTION

According to the present invention there is provided a media playback system comprising:
 a transmitter configured to transmit an indication of a media item;
 a plurality of drones;
 a controller configured to control the spatial configuration of the drones and, in response to receiving the indication of a media item, control the drones to adopt a predefined 3D spatial configuration;
 a mobile device comprising a camera and a media playback unit, wherein the camera is capable of capturing an image of the plurality of drones;
 a processor configured to analyse the captured image to determine the media item that corresponds to the predefined 3D spatial configuration; and
 wherein the media playback unit is configured to play the determined media item.

The processor may further be configured to:
 analyse the captured image to determine the position of the mobile device relative to the plurality of drones;
 calculate a playback time in dependence on the position of the mobile device relative to the plurality of drones; and
 wherein the media playback unit is further configured to play the determined media item at the playback time.

The mobile device may be configured to determine the position of the mobile device relative to the plurality drones using one or more of GPS, terrestrial signal triangulation, and RSSI measurements.

The processor may be configured to calculate a playback time in dependence on the distance of the mobile device to the plurality of drones.

The processor may be further configured to:
 calculate a playback time in dependence on the configuration of the plurality of drones; and
 wherein the media playback unit is further configured to play the determined media item at the playback time.

The transmitter may be arranged on one of the plurality of drones or on the mobile device. The controller may be arranged on one of the plurality of drones or on the mobile device.

The controller may further be configured to, in response to receiving the indication of a media item, control the drones to adopt a predefined series of 3-D spatial configurations.

The controller may be further configured to store a plurality of predefined spatial configurations each corresponding to a respective media item and, in response to receiving the indication of a media item, control the drones to adopt the corresponding predefined 3-D spatial configurations.

Each drone may comprise one or more visual indicia for enhancing the visibility the drone, wherein the visual indicia comprise one or more of: visible light, non-visible light, and reflectors.

The processor may be configured to analyse the captured image to determine the media item that corresponds to the predefined 3-D spatial configuration using an artificial neural network.

The processor may be configured to analyse the captured image to determine the media item that corresponds to the predefined 3-D spatial configuration by:
 analysing the captured image to determine the position of each of the plurality of drones;
 analysing the determined position of each of the plurality of drones using an artificial neural network to determine the media item that corresponds to the predefined 3-D spatial configuration.

The media playback unit may comprise one or more of a loudspeaker and a display.

The mobile device may comprise a smartphone, a tablet, a smart watch, an AR headset, or a VR headset.

There is also provided a method of controlling the playback of media, the method comprising:
 transmitting, at a transmitter, an indication of a media item;
 receiving the indication of the media item at a plurality of drones;
 in response to receiving the indication of the media item, adopting a predefined 3D spatial configuration with the plurality of drones;
 capturing, at a mobile device, an image of the plurality of drones;
 analysing the captured image to determine the media item that corresponds to the predefined 3D spatial configuration;
 playing, at the mobile device, the determined media item.

The method may further comprise:
 analysing the captured image to determine the position of the mobile device relative to the plurality of drones;

calculating a playback time in dependence on the position of the mobile device relative to the plurality of drones; and playing, at the mobile device, the determined media item at the playback time.

The method may further comprise determining the position of the mobile device relative to the plurality drones using one or more of GPS, terrestrial signal triangulation, and RSSI measurements.

The method may further comprise calculating a playback time in dependence on the distance of the mobile device to the plurality of drones.

The method may further comprise:

calculating a playback time in dependence on the configuration of the plurality of drones; and playing the determined media item at the playback time at the mobile device.

There is also provided a location estimation system comprising:

a location estimation unit comprising a memory storing data defining the intended movements of a plurality of drones in three dimensions and one or more processors configured to receive an image and correlate at least part of the image with a two-dimensional projection of the plurality of drones so as to estimate a location from which the image was captured.

The memory may store the intended movements of the drones at a plurality of times, and the one or more processors are configured to correlate at least part of the image with a two-dimensional projection of the plurality of drones so as to estimate a time at which the image was captured.

The system may be configured to:

receive the image from a remote device; and after performing the said estimation select media in dependence on the result of the estimation; and cause the remote device to present that media.

The system may comprise the said device, and wherein the said device may comprise a camera and a wireless transceiver from communicating with the processor(s).

The media may comprise one or more of audio, video, a webpage or a map.

The system may be capable of causing the remote device to present different media depending on the estimated location and/or time.

DESCRIPTION OF THE DRAWINGS

The present invention will now be described by way of example with reference to the accompanying drawings. In the drawings.

DETAILED DESCRIPTION

The following description is presented to enable any person skilled in the art to make and use the invention and is provided in the context of a particular application. Various modifications to the disclosed embodiments will be readily apparent to those skilled in the art.

The general principles defined herein may be applied to other embodiments and applications without departing from the spirit and scope of the present invention. Thus, the present invention is not intended to be limited to the embodiments shown but is to be accorded the widest scope consistent with the principles and features disclosed herein. Embodiments will now be described by way of example only.

Figure 1:
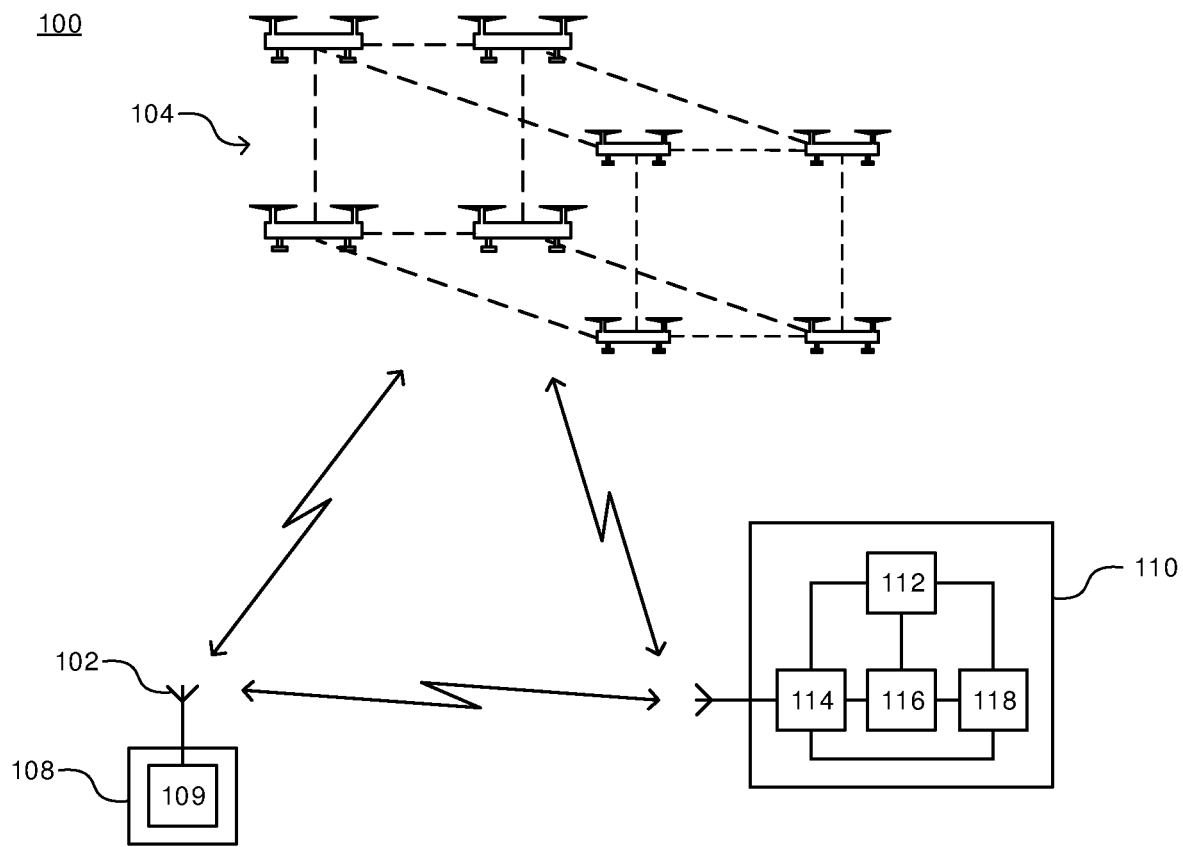
FIG. 1 shows a schematic diagram of an example system for playing media to a user.

FIG. 1 shows an exemplary system 100 for playing media to a user. The system 100 comprises a transmitter 102 configured to transmit an indication of a media item. The indication may comprise an identifier such as an alphanumeric sequence. The indication may comprise a file identifier or a URL referencing the media item on a computer network. The media item may comprise one or more of audio media, visual media, a webpage, or a map, for example the media item may comprise a video or an audio file.

The system 100 also comprises a plurality of drones 104. Each of the drones 104 are able to take off, land, and fly in 3D space independently of the other drones.

Herein, drone refers to an aerial vehicle that is remote controlled, autonomous, or some combination of remote controlled and autonomous. The drones 104 may be helicopters, for example, quadcopters. While the present invention is particularly suitable for vertical take-off and landing (VTOL) aircraft, the invention may also be used with conventional take-off and landing (CTOL) aircraft, short take-off and landing (STOL) aircraft, short take-off and vertical landing (STOVL) aircraft, or aircraft that combine the functionality of any of these types of aircraft (such as tilting rotor or tilting jet nozzle aircraft). The plurality of drones 104 may all be of the same type, or may be made up of combinations of two or more of the aforementioned drone types.

The system 100 also comprises a controller 108 configured to control the spatial configuration of the drones 104. The controller may be arranged on one of the drones, or it may be remote from the drones 104 as shown in FIG. 1. The controller 108 may be configured to transmit navigation information to one or more of the drones 104. One of the drones 104 may be a master drone configured to control the motion of the plurality of drones 104. The controller 108 may be configured to transmit navigation information only to the master drone. Hence, when using a master drone, only one of the plurality of the drones requires long range communication equipment (for example, VHF radio) and the remaining drones need only short range communication equipment (e.g. Bluetooth and/or near-field communication (NFC) equipment). Alternatively, each the drones 104 may comprise communications equipment such as radio (i.e. Wi-Fi) communications apparatus. In this example, the plurality of drones 104, may make up a wireless mesh network for providing internet access to users within Wi-Fi range of one or more of the drones 104.

The controller 108 is configured to control the drones 104 to adopt a predefined spatial configuration in 3D space in response to receiving the indication of a media item from transmitter 102. In other words, upon receiving the indication, the drones 104 arrange themselves into a predefined 3D arrangement. Examples of specific configurations will be discussed below. The controller 108 may comprise a memory 109 configured to store a plurality of predefined spatial configurations each corresponding to a respective media item and, in response to receiving the indication of a media item, control the drones to adopt the corresponding predefined 3D spatial configurations.

The memory 109 may be configured to store a mapping between a plurality of 3D spatial configurations and a corresponding plurality of media items.

The system 100 also comprises a processor 114, and a mobile device 110 comprising a camera 112 and a media playback unit 118. The processor 114 may be part of the mobile device 110 (as shown in FIG. 1), or the processor 114 may separate from the mobile device 110. The system 100 may also comprise a memory 116. The mobile device 110 may comprise a smartphone, a tablet, a smart watch or other wearable apparatus (e.g. a VR or AR headset). One or both of the transmitter 102 and the controller 108 may be arranged on one of the plurality of drones 104, on the mobile device 110, or they may be a located remotely (as shown in FIG. 1). In examples where the transmitter 102 and/or the controller are remote from the drones 104, the plurality of drones 104 comprise a receiver to receive data transmitted from the transmitter 102 and/or the controller 108. The controller 108 may be configured to control the drones 104 to adopt a predefined 3D spatial configuration such that the mobile device 110 plays the media item corresponding to the predefined 3D spatial configuration synchronously with a further media device. The further media device may comprise one or more speakers, lights, or displays.

The camera 112 is configured to capture images, in particular, the camera 112 is configured to capture an image of the plurality of drones 104. The camera 112 is configured to store captured image data in the memory 116 and/or to pass captured image data to the processor 114.

The processor 114 is configured to analyse the captured image to determine the media item that corresponds to the predefined 3D spatial configuration. In a simple example, an image of six drones forming a cube (with each drone providing a vertex of the cube) may be analysed by the processor 114 in order to determine that a first video is to be played. The processor 114 may have access (for example in memory 116) to a plurality of spatial configurations that are each mapped to a different media item. The mapping may be implemented by a lookup table. The processor 114 may be configured to determine the spatial configuration of the drones 104 and determine a corresponding media item in dependence on the mapping. For example, a cube configuration of drones may correspond to a first video and a trapezoidal prism configuration of drones may correspond to a second video.

Figure 2:
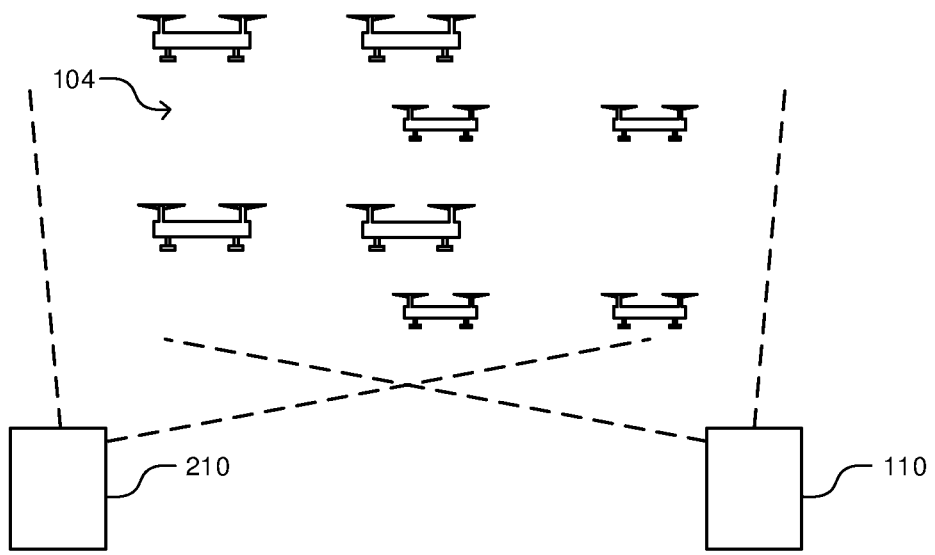
FIG. 2 shows a schematic diagram of system including two mobile devices.
Figure 3A:
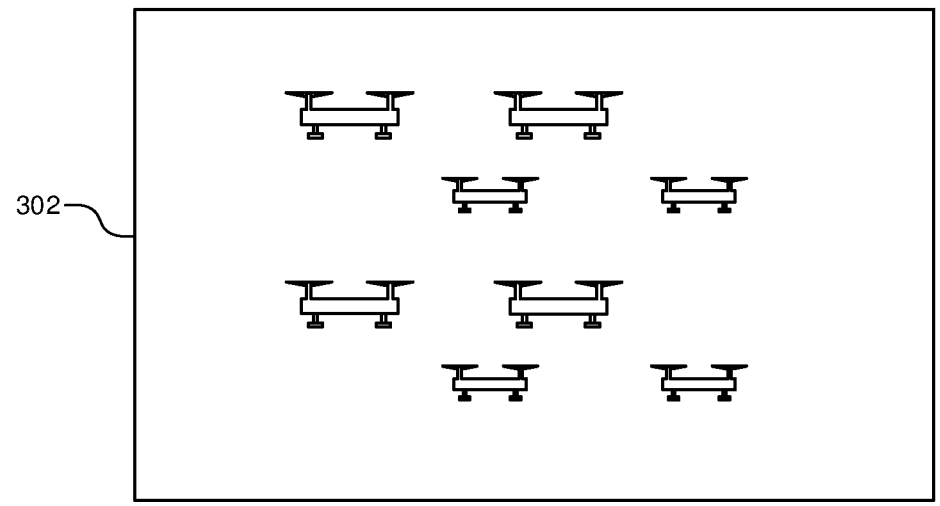
FIGS. 3A and 3B show example images captured by the camera of a mobile device.
Figure 3B:
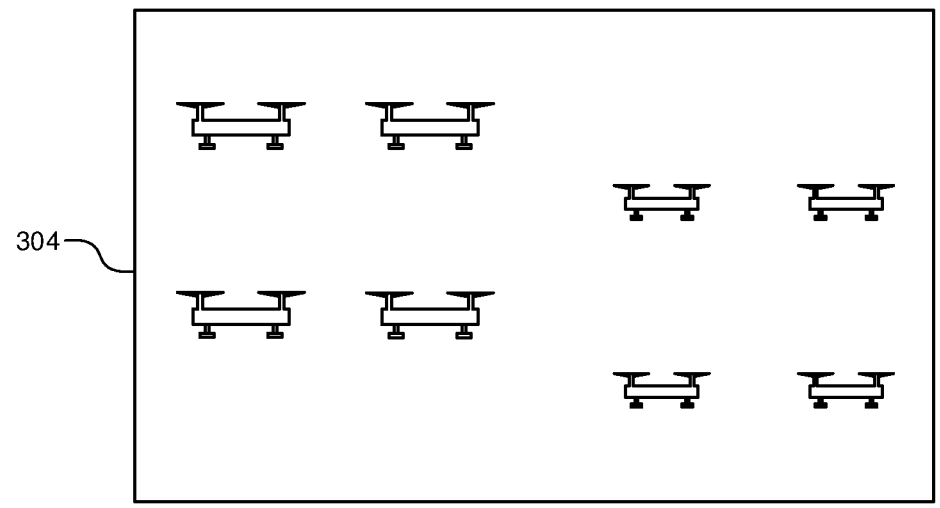

Mobile devices at different positions will capture different images of the drones 104 by virtue of their different points of view. FIG. 2 illustrates a first mobile device 110 and a second mobile device 210 and their different viewpoints of the plurality of drones 104. The system 100 may comprise one or more further mobile devices 210. Each further mobile device 210 may be configured identically to the first mobile device 110.

The processor 114 may be configured to analyse the images using an object recognition method, for example an artificial neural network (ANN) such as a deep neural network (DNN). In particular, the processor 114 may be configured to analyse the images using a convolutional neural network (CNN). The ANN may be trained to recognise the spatial configurations of the drones 104 using a number of images of drones that have been classified by other means (e.g., manually).

The reliability of the image analysis performed by the processor 114 can be improved by ensuring that the spatial configuration of the drones 104 are visually distinct from one another, ideally from as many viewing angles as possible. Hence, 2D configurations in which all of the drones 104 lie in a plane are generally not suitable as the number of viewing angles is limited. For example, one 2D configuration of drones cannot be differentiated from another 2D configuration when viewed from within the plane in which the drones lie. However, the controller 108 may have stored in memory 109 one 2D spatial configuration provided and a plurality of 3D spatial configurations.

As part of the analysis performed by the processor 114, the processor may be configured to determine the position of each drone 104. This may include determined a coordinate set for each drone 104. For example, the processor 114 may be configured to determine horizontal and a vertical position (i.e. an x and a y coordinate) for each drone based on the position of each drone in the captured image. The processor may be configured to determine a depth value (i.e. a z coordinate) of the drone based on the size of each drone in the captured image. Hence, the remaining analysis can be performed on a simplified data set comprising a plurality of coordinate sets indicating the locations of each of the drones 104.

The media playback unit 118 is configured to play the determined media item. The media playback unit 118 may comprise one or more of a loudspeaker and a display (for example an LCD or LED display). The media playback unit 118 may be configured to retrieve the media item from memory 116 and/or retrieve the media item from a remote server. The media item may be played immediately in response to the processor 114 determining the media item. Alternatively, the media item may be played at a specified playback time. The playback time may be set by the mobile device 110, for example the playback time may be stored in memory 116. The spatial configuration of the drones 104 may additionally convey a playback time to the mobile device 110. Hence, a playback time may be calculated by the processor 114 in dependence on the configuration of drones. For example, a plurality of drones 104 arranged in a cube may indicate that a media item is to be played at a playback time $T_1$. The playback time may be defined in terms of the system time of the mobile device 110. In examples where several media items are to be played in succession by the mobile device 110, the playback time may be defined relative to the playback time of a preceding media item.

The playback time may depend on the position of the mobile device 110 relative to the plurality of drones 104. The processor 114 may be configured to determine the position of the mobile device 110 relative to the plurality of drones. More specifically, the processor 114 may be configured to determine the position of the mobile device 110 relative to a point within or near the plurality of drones 104, for example the point may lie on a specific drone or at the centre of the plurality of drones. The processor 114 may be configured determine the position of the mobile device 110 relative to the plurality of drones 104 by analysing the captured image. A given spatial configuration of drones 104 will appear different to observers with different perspectives, allowing both the orientation of and distance to the drones to be determined by the mobile device 110. Alternatively, the image analysis performed by the processor 114 may be limited to determining a media item, while the position of the mobile device 110 relative to the plurality of drones 104 may be determined by other means. For example, the mobile device 110 may be configured to determine the position of the mobile device relative to the plurality drones 104 using one or more of GPS, terrestrial signal triangulation, and RSSI measurements. The media playback unit 118 may be configured to play the determined media item in response to the processor 104 determining that the mobile device 110 device is at a particular position relative to the plurality of drones 104. For example, if the plurality of drones 104 are rotating, the media playback unit 118 may only play the determined media item when the processor 104 determines that the mobile device 110 is at a particular position relative to the plurality of drones, for example when the camera 112 captures an image of the drones 104 from a particular angle.

Figure 4:
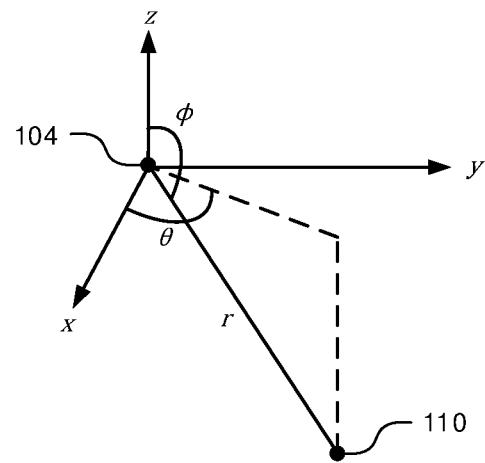
FIG. 4 illustrate example coordinate systems that the system may use.

FIG. 4 shows exemplary coordinate systems, with the plurality of drones 104 at the origin at coordinates representing the position of the mobile device 110 relative to the drones 104. The coordinates have their normal meaning in the art, i.e. x, y and z are Cartesian coordinates and r, $\phi$, and $\theta$ are spherical polar coordinates. The processor 114 may calculate a playback time in dependence on one or more of these spatial coordinates. In examples where there are more than one mobile device each configured to determine a playback time in the same manner, this can cause the media to be played by each individual mobile device at a different time. This can cause media to be played out by mobile device in various patterns, for example, emanating from the drones in all directions (when the playback time is dependent on r or $\phi$), emanating from the drones in a single direction (when the playback time is dependent on x or y), or sweeping around the drones (when the playback time is dependent on $\theta$).

Figure 5:
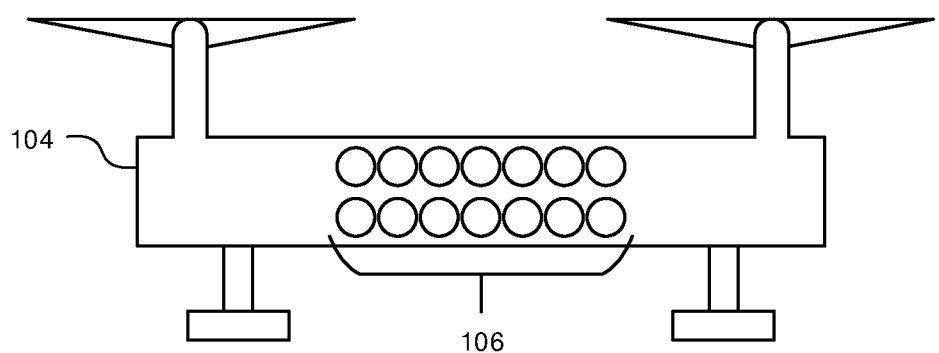
FIG. 5 shows an example of a drone including visual indicia.

FIG. 5 shows an example of a drone 104 comprising visual indicia 106. The visual indicia 106 on a given drone 104 may comprise one or more lights (e.g. LEDs), or reflective strips. The visual indicia 106 can ensure that the drones 104 are visible to the camera 112 even in low light conditions. The processor 114 may be configured to analyse the captured image to identify one or more visual indicia 106 on the drones 104 and to determine the media item in dependence on the arrangement of the visual indicia 106. As a secondary effect, the visual indicia 106 (when visible to the human eye) may further be used to enhance the aesthetic appeal of the plurality of drones 104 to a viewer. For example, where the visual indicia 106 comprise lights, each light may be individually controllable to output light of at a colour and brightness defined by the controller 108. In this way, each light can act like a pixel of a display.

The visual indicia 106 may not be visible to human eyes, and may comprise, for example, infrared lights. The drones may comprise different visual indicia 106. Each drone may comprise different visual indicia 106. In this way, further information can be conveyed to the mobile device 110. For example, further information may be conveyed to the mobile device 110 by providing the drones 104 with predetermined configurations of visual indicia 106.

The visual indicia 106 may be configured to transmit data to the mobile device 110. The visual indicia 106 may be configured to transmit data by modulating the light, for example, by switching a light on and off, or by modulating the amplitude and/or frequency of the outputted light. The visual indicia 106 may be configured to transmit data using a Li-Fi protocol.

Figure 6:
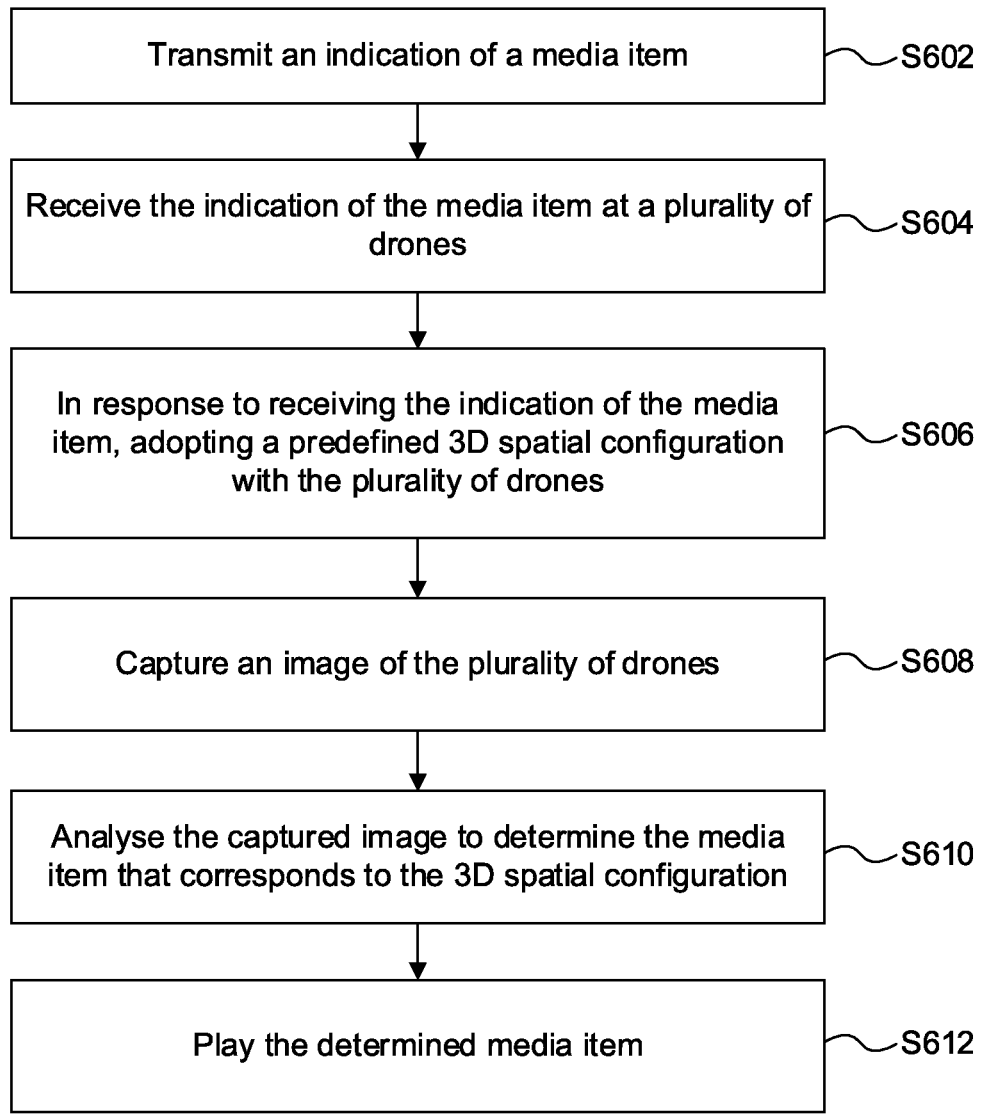
FIG. 6 shows an example method of operating the media playback system.

FIG. 6 illustrates an exemplary method of operating the system 100 as described above.

At step 602, an indication of a media item is transmitted. The indication may comprise an identifier such as an alphanumeric sequence. The indication may comprise a file identifier or a URL referencing the media item on a computer network. The media item may comprise one or more of an audio or visual media, for example a song or a video. The media item may be transmitted by the transmitter 102. At step 604, the transmitted indication is received at a plurality of drones 104. The indication may be received by one or each of the drones 104.

At step 606, in response to receiving the indication of the media item, the plurality of drones 104 adopt a predefined 3D spatial configuration. This step may be initiated by controller 108, which may be arranged on one or more of the drones 104.

At step 608, an image of the plurality of drones is captured at a mobile device 110 and, at step 610, the captured image is analysed by the mobile device in order to determine the media item that corresponds to the 3D spatial configuration. The captured image may be analysed using an object recognition method such as an artificial neural network. The captured image may be analysed to determine the position of each of the plurality of drones. As described above, a playback time for the media item may be determined in dependence on the spatial configuration of the drones 104, or in dependence on the position of the mobile device 110 relative to the plurality of drones 104.

At step 612, the media item is played by the mobile device 110. This may comprise one or more of playing a video or audio file. Accordingly, the mobile device may comprise a loudspeaker and/or a display.

The present invention provides an improved manner of conveying indications of media items to a user's mobile device that conveys visually, without requiring the mobile device to access to a local network or the internet. This is particularly relevant in situations in which a mobile device has no or limited access to a network, for example in remote locations or in large crowds in which transmission masts/towers are overloaded such as at sports games or concerts. The invention allows information to be conveyed to a user, for example safety alerts, without recourse to centralised audiovisual systems.

Traditional forms of media, such as film, television and radio require no active participation on the part of the user. As the present invention allows playing media to a user based on a captured image of a swarm of drones, some action on behalf of a user may be required in order to properly frame and capture the image. Such user participation enhances engagement with the media in a way that traditional non-interactive media does not.

The system 100 of FIG. 1, particularly the controller 108 and mobile device 110, are shown as comprising a number of functional blocks. This is schematic only and is not intended to define a strict division between different logic elements of such entities. Each functional block may be provided in any suitable manner. It is to be understood that intermediate values described herein as being passed between the blocks need not be physically generated by controller 108 or the mobile device 100 at any point and may merely represent logical values which conveniently describe the processing performed by the controller 108 or the mobile device 110 between their inputs and outputs. The controller 110 may be embodied in hardware on an integrated circuit.

In one example, a drone may be considered to be a vehicle that is capable of autonomous or semi-autonomous flight. Typically, it may have onboard systems that can automatically maintain a stable flying position or flightpath. It may be controllable to adopt a flying position or flightpath either under remote control or by virtue of having a memory that can be programmed to store a series of positions or paths, and a processor configured cause the drone to automatically adopt those positions or paths in turn. A drone may comprise apparatus for displaying information to persons nearby. It may, for example have one or more light emitting devices. It/those may be controlled by the processor in response to a program pre-stored in the memory, or under remote control. It/they may be capable of emitting light of varying colours and/or intensity. The colour and/or intensity may vary with direction. One or more drones may be flown to provide an aerial display, e.g. to an audience on the ground.

A convenient approach for providing such a display is to have a control system on the ground which stores pre-programmed routes and display states over time for each of a plurality of drones. The control system can communicate wirelessly, e.g. by radio signals, with each of the drones—either directly or indirectly. During the display, the control system communicates with the drones to cause them to fly in the pre-programmed states and adopt the appropriate display states. This can present a moving aerial tableau of illumination to a viewer, The control system may know the positions and appearance of the drones at any time from (i) the set of pre-programmed routes and states and the current point in the display and/or (ii) information reported back from the drones to the control system as to their position and/or course and/or display state.

The constellation of drones presenting the display will appear differently when viewed from different positions. The control system has knowledge of the current position and appearance of the drones. With this information the control system (which may be distributed between multiple processing units and/or locations) the control system can, using geometric functions, estimate the appearance of the constellation of drones from different locations.

This ability can be used in a number of ways.

1. A mobile device such as a mobile phone may be equipped with a camera. A user of the device may capture an image of the constellation of drones. That image, or data derived from it, may then be compared with the expected three-dimensional pattern of the drones and/or their appearance (determined as indicated above) to estimate the location of the user. For example, the device may transmit the image to a server which can perform the comparison. The server can then return to the device an indication of its location and/or media selected in dependence on the device's location. In one example, the constellation of drones may have different appearances from different viewpoints. Media, such as audio and/or video may be transmitted to the device to be played out by the device to its user. That media may be selected to correspond to the appearance of the constellation from the point of view of the user. For instance, from a first point of view the constellation may have the appearance of a first subject, such as a specific individual, and from a second point of view the constellation may have the appearance of a second subject, such as a second specific individual. Media (e.g. audio) appropriate to the subject as viewed from the point of view of the user of a device may be served to that device and played out by that device so that the user of that device can experience play-out that matches the appearance to them of the constellation. The constellation may provide a tableau at an event. It may be a so-called silent event—that is, there is no public address sound coordinated with the movement of the drone constellation. Instead, viewers of the constellation may listen to sound received as described above. This can help to reduce noise inconvenience to other people.

2. When the drone controller receives an image of the drone constellation, that image may be compared with the expected appearance of the drone constellation. Differences may be noted and used to correct the operation of drones, or bring replacement drones in to service.

3. When a viewer of a drone display captures an image of the drones, the user may be directed to a web page selected in dependence on the image. The web page may relate to an object near the location of the viewer. For example, from knowledge of the viewer's position has been determined by comparison with the expected appearance of the drones, the user may be automatically presented with relevant public transport directions, or public safety information, on a website for a nearby shop or restaurant, or relevant offers.

Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, byte-code, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be or comprise any kind of general purpose or dedicated processor, such as a CPU, GPU, NNA, System-on-chip, state machine, media processor, an application-specific integrated circuit (ASIC), a programmable logic array, a field-programmable gate array (FPGA), or the like. A computer or computer system may comprise one or more processors.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A media playback system comprising:
   a transmitter configured to transmit an indication of a media item;
   a plurality of drones;
   a controller configured to control the spatial configuration of the drones and, in response to receiving the indication of a media item, control the drones to adopt a predefined 3D spatial configuration;
   a mobile device comprising a camera and a media playback unit, wherein the camera is capable of capturing an image of the plurality of drones;
   a processor configured to analyse the captured image to determine the media item that corresponds to the predefined 3D spatial configuration; and
   wherein the media playback unit is configured to play the determined media item at the mobile device.

2. The media playback system of claim 1, wherein the processor is further configured to:
   analyse the captured image to determine the position of the mobile device relative to the plurality of drones;
   calculate a playback time in dependence on the position of the mobile device relative to the plurality of drones; and
   wherein the media playback unit is further configured to play the determined media item at the playback time.

3. The media playback system of claim 2, wherein the processor is configured to calculate a playback time in dependence on the distance of the mobile device to the plurality of drones.

4. The media playback system of claim 1, wherein the mobile device is configured to determine the position of the mobile device relative to the plurality drones using one or more of GPS, terrestrial signal triangulation, and RSSI measurements.

5. The media playback system of claim 1, wherein the processor is further configured to:
   calculate a playback time in dependence on the configuration of the plurality of drones; and
   wherein the media playback unit is further configured to play the determined media item at the playback time.

6. The media playback system of claim 1, wherein the transmitter is arranged on one of the plurality of drones or on the mobile device.

7. The media playback system of claim 1, wherein the controller is arranged on one of the plurality of drones or on the mobile device.

8. The media playback system of claim 1, wherein the controller is further configured to, in response to receiving the indication of a media item, control the drones to adopt a predefined series of 3-D spatial configurations.

9. The media playback system of claim 1, wherein the controller is further configured to store a plurality of predefined spatial configurations each corresponding to a respective media item and, in response to receiving the indication of a media item, control the drones to adopt the corresponding predefined 3-D spatial configurations.

10. The media playback system of claim 1, wherein each drone comprises one or more visual indicia for enhancing the visibility the drone, wherein the visual indicia comprise one or more of: visible light, non-visible light, and reflectors.

11. The media playback system of claim 1, wherein the processor is configured to analyse the captured image to determine the media item that corresponds to the predefined 3-D spatial configuration using an artificial neural network.

12. The media playback system of claim 11, wherein the processor is configured to analyse the captured image to determine the media item that corresponds to the predefined 3-D spatial configuration by:
   analysing the captured image to determine the position of each of the plurality of drones;
   analysing the determined position of each of the plurality of drones using an artificial neural network to determine the media item that corresponds to the predefined 3-D spatial configuration.

13. The media playback system of claim 1, wherein the media playback unit comprises one or more of a loudspeaker and a display.

14. The media playback system of claim 1, wherein the mobile device comprises a smartphone, a tablet, a smart watch, an AR headset, or a VR headset.

15. A method of controlling the playback of media, the method comprising:
   transmitting, at a transmitter, an indication of a media item;
   receiving the indication of the media item at a plurality of drones;
   in response to receiving the indication of the media item, adopting a predefined 3D spatial configuration with the plurality of drones;
   capturing, at a mobile device, an image of the plurality of drones;
   analysing the captured image to determine the media item that corresponds to the predefined 3D spatial configuration;
   playing, at the mobile device, the determined media item.

16. The method of claim 15, further comprising:
   analysing the captured image to determine the position of the mobile device relative to the plurality of drones;
   calculating a playback time in dependence on the position of the mobile device relative to the plurality of drones; and
   playing, at the mobile device, the determined media item at the playback time.

17. The method of claim 15, further comprising determining the position of the mobile device relative to the plurality drones using one or more of GPS, terrestrial signal triangulation, and RSSI measurements.

18. The method of claim 15, further comprising calculating a playback time in dependence on the distance of the mobile device to the plurality of drones.

19. The method of claim 15, further comprising:
   calculating a playback time in dependence on the configuration of the plurality of drones; and
   playing the determined media item at the playback time at the mobile device.

* * * * *